United States Patent [19]

Schofield et al.

[11] Patent Number: 6,154,847
[45] Date of Patent: Nov. 28, 2000

[54] METHOD AND SYSTEM FOR PERFORMING RESOURCE UPDATES AND RECOVERING OPERATIONAL RECORDS WITHIN A FAULT-TOLERANT TRANSACTION-ORIENTED DATA PROCESSING SYSTEM

[75] Inventors: Andrew John Schofield, Eastleigh; Anthony Robert Washer, Romsey, both of United Kingdom

[73] Assignee: International Business Machines Corporation, Armonk, N.Y.

[21] Appl. No.: 08/299,715

[22] Filed: Sep. 1, 1994

[30] Foreign Application Priority Data

Sep. 2, 1993 [GB] United Kingdom .................. 9318167

[51] Int. Cl.[7] ................................ H02H 3/05
[52] U.S. Cl. ................... 714/4; 714/20; 714/21
[58] Field of Search ..................... 395/575, 650, 395/600; 714/3, 15, 20, 21, 4

[56] References Cited

U.S. PATENT DOCUMENTS

| | | | |
|---|---|---|---|
| 5,095,421 | 3/1992 | Freund ..................................... | 395/650 |
| 5,170,480 | 12/1992 | Mohan et al. ........................... | 395/600 |
| 5,201,044 | 4/1993 | Frey, Jr. et al. ......................... | 395/575 |
| 5,212,788 | 5/1993 | Lomet et al. ............................ | 395/600 |
| 5,247,644 | 9/1993 | Thompson et al. ..................... | 395/600 |

FOREIGN PATENT DOCUMENTS

| | | | |
|---|---|---|---|
| 0 098 928 | 2/1983 | European Pat. Off. ........ | G06F 11/00 |
| 0 097 239 | 6/1983 | European Pat. Off. ........ | G06F 15/40 |
| 0 295 424 | 10/1988 | European Pat. Off. ........ | G06F 11/14 |

OTHER PUBLICATIONS

Levy & Silberschatz, Incremental Recovery in Main Memory Database Systems, IEEE Transactions on Knowledge and Data Engineering, Dec. 1992, at 529.

Curtis, Informix–Turbo, 1988 Computer Society International Conference, at 422.

Rymer, Unix OLTP, Patricia Sybold's Unix in the Office, Aug. 1990, at 1.

Oracle RDBMS, SQL Language Reference Manual, Version 7.0, May 1992, at 5–101 to 5–105, 5–115 to 5–120.

Oracle RDBMS, Database Administrator's Guide, Version 7.0 (3 volume series), May 1992, at chapts. 1, 12, 14, and 26.

*Primary Examiner*—Norman M. Wright
*Attorney, Agent, or Firm*—Edward H. Duffield; Felsman, Bradley, Vaden, Gunter & Dillon, LLP

[57] ABSTRACT

A fault-tolerant transaction processing system and method stores records associated with operations of the system in order to permit recovery in the event of a need to roll back a transaction or to restart the system. At least some of the operational records are stored as a recovery log in low-speed non-volatile storage and at least some are stored as a recovery list in high speed volatile storage. Rollback of an individual transaction is effected by reference to the recovery list whereas restart of the system is effected by reference to the recovery log.

2 Claims, 3 Drawing Sheets

METHOD AND SYSTEM FOR PERFORMING RESOURCE UPDATES AND RECOVERING OPERATIONAL RECORDS WITHIN A FAULT-TOLERANT TRANSACTION-ORIENTED DATA PROCESSING SYSTEM

BACKGROUND OF THE INVENTION

1. Technical Field

The present invention relates to fault tolerant transaction-oriented data processing, and in particular to an efficient method and system for supporting recoverable resource updates within transactions such as in a transaction-oriented messaging system, file system or database system.

2. Description of the Related Art

Many business functions can be implemented by transaction processing using application-oriented computer programs. Most application-oriented programs need to access some form of computer system facilities (facilities such as processors, databases, files, input/output devices, other application programs)—which are generically known as resources. The system software which controls these resources is generically known as the resource manager. A common processing requirement is to be able to make a coordinated set of changes to one or more resources (and in particular to collections of data objects), such that either all of the changes take effect, and the resources are moved to a new consistent state, or none of them does. This property of all-or-none processing is known as "atomicity".

As pointed out by C. J. Date in "An Introduction to Data Base Systems", Vol. 1, 4th Edition, Addison-Wesley Publishing Co., 1986, Ch.18, a "transaction" is a logical unit of work referencing a sequence of associated operations that transforms a consistent state of one or more recoverable resources into another consistent state (without necessarily preserving consistency at all intermediate points). Transaction processing is the management of discrete units of work that access and update shared data.

It is known to provide fault-tolerant transaction processing systems which can maintain data consistency and transaction atomicity over system, media and transaction failures (an example of the latter being application detected error conditions leading to the inability of a transaction to complete). To enable recovery of resources to a consistent state following a failure, it is necessary for the system to keep a record of the state of system resources at the time of the failure, which includes knowing which transactions had been completed, to enable the completed transactions to be performed again, and which transactions were in progress to enable the operations within an uncompleted transaction to be undone. A transaction thus defines a unit of recovery as well as a unit of work.

It is frequently a processing requirement for resource updates to be made within a transaction without the delay of verifying, prior to making updates, whether the transaction can complete successfully. For atomicity and consistency in such systems, it is thus necessary to provide a backward recovery facility for when transactions fail to complete successfully—enabling all changes that have been made to resources during the partial execution to be removed.

The restoration of resources to the consistent state which existed before a transaction began is known as ROLLBACK (or synonymously as BACKOUT; a total ROLLBACK of a transaction being known as an ABORT) of the transaction, the changes generally being removed in the reverse chronological order from which they were originally made.

One example of a system which may employ transactional techniques is a messaging and queuing system described in the document "IBM Messaging and Queuing Series—technical Reference" (SC33-0850-01, 1993). Messaging and queuing provides a number of facilities for high-level inter-program communication. It encompasses:

Messaging—a simple means of program-to-program communication that hides communication protocols.

Queuing—the deferred delivery of messages. This enables asynchronous communication between processes that may not be simultaneously active, or for which no data link is active. The messaging and queuing service can guarantee subsequent delivery to the target application.

Message driven processing—the accomplishment of an application task by the flow of messages to a number of processes in distributed system. The processes work together by accessing queued messages and generating new messages until the application task is completed.

Most applications need to access resources of one form or another, and a common requirement is to be able to make a co-ordinated set of changes to two or more resources. "Co-ordinated" means that either all of the changes made to the resources take effect, or none of them does.

Queues are no exception to this—applications need to be able to get and put messages (and possibly update other resources, such as databases), and know that either all of the operations take effect, or that none of them does. The set of operations involved in this is called a transaction or unit of work. The following example illustrates this:

In a financial application that transfers funds from one account to another at the same location, there are two basic operations that need to be carried out: the debit of one account, and the credit of the other. Normally both of the operations succeed, but if one fails, both must fail.

The failure might be for operational reasons (for example, one queue being temporarily unavailable), in which case the transaction can be presented again later. Alternatively, the failure might be because there are insufficient funds in the account to be debited, in which case a suitable response must be returned to the initiator of the transaction.

The debiting of one account and the crediting of the other constitute a unit of work.

A unit of work starts when the first recoverable resource is affected. For message queuing, this means when a message is got or put as part of a unit of work. The unit of work ends either when the application ends, or when the application declares a syncpoint (see below.) If the work is ended by the application declaring a syncpoint, another unit of work can then start, so that one instance of an application can be involved with several sequential units of work.

Each get or put operation can separately participate in the current unit of work. The application chooses which operations participate by specifying the appropriate "syncpoint" or "no-syncpoint" option on MQGET, MQPUT and MQPUT1 calls. If neither option is specified, participation of the call within the current unit of work is determined by the environment.

The application ends a unit of work by declaring a syncpoint. When a syncpoint is declared, any party that has an interest in the unit of work can vote "no" and so cause the unit of work to be backed out; this has the effect of undoing all of the changes that were made as part of the unit of work. If all parties vote "yes", the unit of work is committed, and the changes that were made as part of the unit of work become permanent. Parties interest in the unit of work can be:

The application

The queue manager

Other resource managers

The application declares a syncpoint, and registers its vote, by issuing the appropriate environment-dependent call.

If a message is put as part of a unit of work, the message does not become generally available for retrieval by applications until that unit of work is committed successfully. The one exception to this is the application which put the message. It can retrieve the message from the destination queue as part of the original unit of work before that unit of work is committed; the destination queue must be a local queue for this to be possible.

If the destination queue belongs to a remote queue manager, the message is not available to be sent from the local queue manager until the unit of work is committed. This means that it is not possible to send a request message and receive the reply to that request as part of the same unit of work; the unit of work containing the request message must be committed before it is possible to receive the reply.

Any errors detected by the queue manager when the message is put are returned to the application immediately by means of the completion code and reason code parameters. Errors that can be detected in this way include:

Message too big for queue

Queue full

Put requests inhibited for queue.

Failure to put the message does not affect the status of the unit of work (because that message is not part of the unit of work); the application can still commit or back out the unit of work, as required.

However, if a message that was put successfully as part of the unit of work causes an error when the application attempts to commit the unit of work, the unit of work is backed out.

If a message is retrieved as part of a unit of work, the message is removed from the queue and so is no longer available to other applications. However, the message is not discarded; it is retained by the queue manager until the unit of work is either committed or backed out.

If the unit of work is committed successfully, the queue manager then discards the message. However, if the unit of work is backed out the message is reinstated in the queue in its original position, and so becomes available once again to be browsed or retrieved by the same or another application.

Units of work should not be confused with the property of messages known as persistence. Message persistence defines whether or not the message survives failures and restarts of the queue manager.

Units of work can be used to protect against failures of the application, or against failures of other resource managers operating within the same unit of work; in this context, "failures" can include program-declared failures as well as error situations. Message persistence, on the other hand, protects against failures of the queue manager.

Many applications that use units of work will also want to use persistent messages. However, there are some situations in which it may be beneficial to use one without the other. For example, if the application contains logic to recover after a failure of the queue manager, using units of work with nonpersistent messages gives a performance benefit in the normal, nonfailure case. This combination can also be used to ensure that a final (nonpersistent) message is not sent if the unit of work is backed out before it reaches the syncpoint.

Returning to the general discussion, to provide the information which is necessary for recovery from system and transaction failures, all actions performed on recoverable data are generally recorded in a recovery log. This log is a persistent store for variable length records, which can be written to at its end only, but can be read in any order. Typically, there is written for each resource updating operation an UNDO-log record and a REDO-log record, the former indicating the old state of the resource and the latter indicating the new state of the resource. In the event of a failure, the progress state of a unit of work determines which records will be used for recovery: the UNDO log records will be read for transactions that were uncompleted at failure to permit restoration of the system resources to the state that existed before the transaction began, whereas the REDO records will be read for transactions that were completed to return the resources to the state which existed after the transaction's updates had been made. The log, however, may employ "transition logging" which requires only one log entry—the difference between before and after states—for each resource update. Not all resources need to be made recoverable, and hence it is known to be able to define resources as either "persistent" (non-volatile) or "non-persistent" (volatile).

In many of the known systems, log records are also read at successful completion of a transaction to determine which operations were performed within the transaction and so to determine which resource updates can now be confirmed as permanent: the resource updating application performs a COMMIT operation to confirm all updates in the successfully completed transaction.

If the contents of a resource (e.g., a database) were lost due to media failure, it would be possible to recreate the resource if all REDO log records since the resource was created were saved and available. However, to limit the amount of log information which must be read and processed on system restart following a failure (and therefore reduce the cost and improve the speed of recovery), a non-volatile copy of the resource may be made periodically (either at regular time intervals or after a predetermined amount of system activity) and saved, the log position at the time the copy is made being noted. This is known as taking a checkpoint. Then, if a failure occurs, the recovery log is processed from the noted position, the state of resources at the time of the most recent copy then serving as the initialising information from which resources are recovered. The REDO records from that point, representing all subsequent actions to the resource, are reprocessed against the saved copy of the resource.

Methods to reduce the overhead of logging are described by C. Mohan et al in "ARIES: A Transaction Recovery Method Supporting Fine Granularity Locking and Partial Rollbacks Using Write-Ahead Logging", IBM Research Report RJ6649 (Computer Science), Jan. 19, 1989. The ARIES recovery method keeps track of changes made to resources using a log. In addition to logging update activities performed during forward processing of transactions, logs are also written of resource changes performed during total or partial rollbacks of transactions during both normal processing and restart processing. Partial rollbacks to an intermediate checkpoint within the transaction are supported.

The log records written for the backout of an operation are known as Compensating Log Records (CLR). In ARIES each CLR contains, in addition to a description of the compensating action, a pointer to that transaction's log record which precedes the one that the CLR compensates.

This pointer allows determination of precisely how much of the transaction has not been undone so far. Since CLRs are available to describe what actions are available during undo, the undo action need not be the exact inverse of the action that is being compensated (i.e., logical undo is possible).

During restart following an abnormal termination of the transaction (e.g., after a system failure), the log is scanned, starting from the first record of the last complete checkpoint, up to the end of the log. During this first "analysis" pass, information about pages that were potentially more up to date in the buffers than in the permanent version of the data resource and transactions that were in progress at the time of the termination is gathered. Then updates that did not get written to nonvolatile storage before the termination are repeated for all transactions, including for those transactions that were in progress at the time of the crash.

This essentially re-establishes the state of resources as of the time of the crash, as far as the actions represented in the log as of the crash time are concerned. No logging is done of the updates redone during this REDO pass.

The next pass is the UNDO pass during which all in progress transactions' updates are rolled back in reverse chronological order, in a single sweep of the log. For those transactions that were already rolling back at the time of the crash, only those actions which had not already been undone will be rolled back. This means that actions recorded in CLRs are never undone (i.e., CLRs are not compensated). This is possible because such transactions are redone and since the last CLR written for each transaction points to the next non-CLR record that is to be undone.

ARIES does not require the forcing of modified pages to non-volatile storage during any of this processing. It is also possible to take checkpoints during recovery. No locks have to be acquired during transaction rollback, thereby preventing rolling back transactions from getting involved in deadlocks.

On some operating systems, applications are not provided with operating system privileges. In such cases selective scanning of log records and possibly also writing of logs to disk are relatively inefficient aspects of the transaction processing, and so BACKOUT operations will be inefficient if the known methods of logging and reading from the log are used to support data consistency. The same also applies to COMMIT operations in some of the known systems. However, in other systems processing is carried out with COMMIT presumed to occur at resolution of a transaction (see Mohan, Lindsay, Obermarck, "Transaction Management in the R Distributed Database Management System", ACM Transactions on Database Systems", Vol. 11, No. 4, December 1986). Then log records need not be scanned for COMMIT processing, but only for the exceptional case of BACKOUT following a failure.

Increasingly, there is a need to provide recovery facilities which do not suffer from the limitations of particular operating systems' inefficient log scanning if efficient fault-tolerant data processing is to be supported for such operating systems.

SUMMARY OF THE INVENTION

It is therefore one object of the present invention to provide a method and system for improved data processing.

It is another object of the present invention to provide a method and system for fault tolerant transaction-oriented data processing.

It is yet another object of the present invention to provide a method and system for fault tolerant transaction-oriented data processing which supports recoverable resource updates within transactions such as in a transaction-oriented messaging system, file system or database system.

The foregoing objects are achieved as is now described. A fault-tolerant transaction processing system and method stores records associated with operations of the system in order to permit recovery in the event of a need to roll back a transaction or to restart the system. At least some of the operational records are stored as a recovery log in low-speed non-volatile storage and at least some are stored as a recovery list in high speed volatile storage. Rollback of an individual transaction is effected by reference to the recovery list whereas restart of the system is effected by reference to the recovery log.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
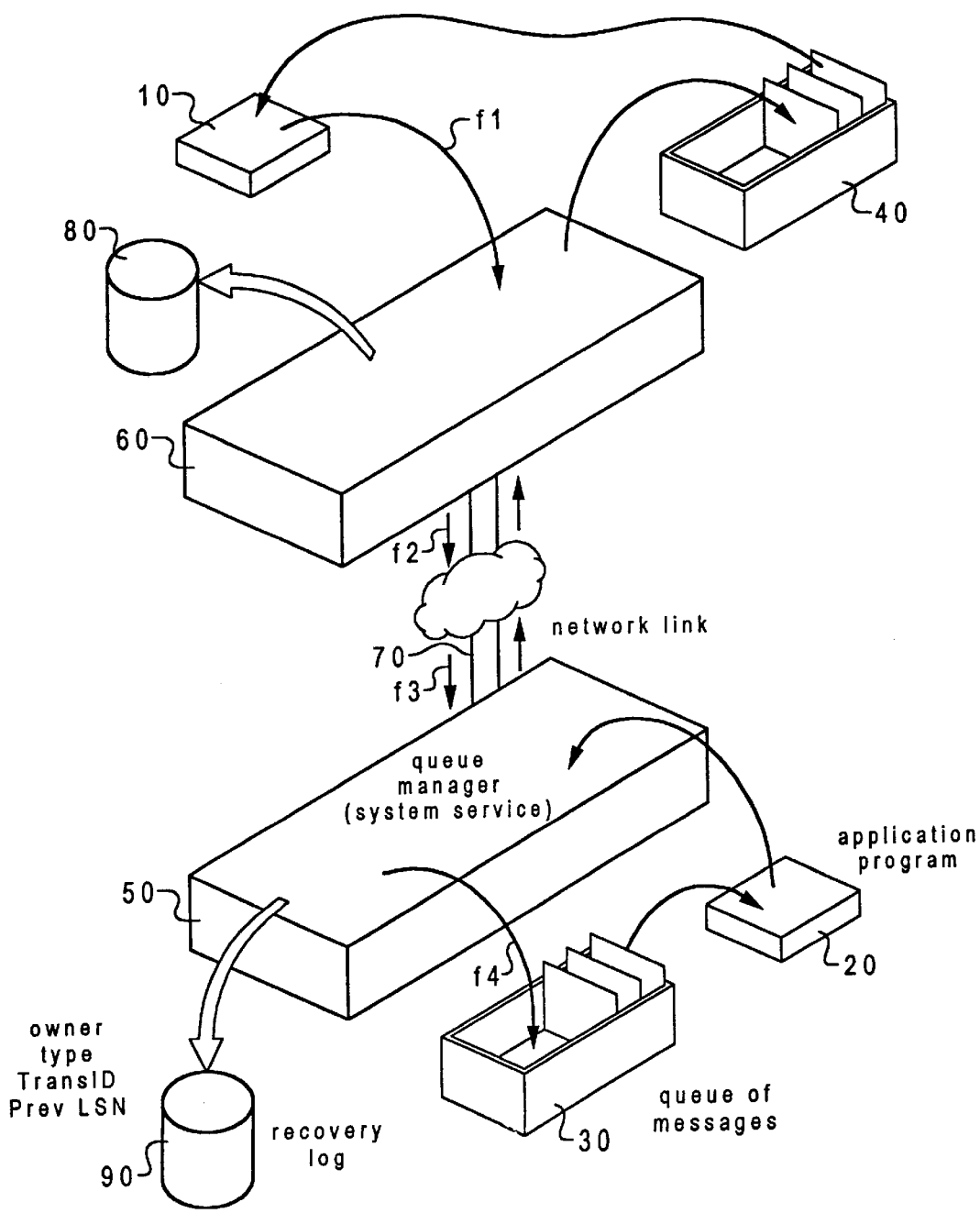
FIG. 1 is a schematic representation of two programs communicating with each other in a transaction-oriented messaging and queuing system.

The present invention provides a transaction processing system in which records associated with operations of the system are stored in order to permit recovery in the event of a need to roll back a transaction or to restart the system, the system having both high speed volatile storage and low speed non-volatile storage, at least some of said operational records being stored as a recovery log in said non-volatile storage, characterized in that at least some operational records are also stored as a recovery list in said volatile storage, rollback of an individual transaction being effected by reference to said recovery list and restart of the system being effected by reference to said recovery log.

Expressed alternatively, the present invention provides a method of transaction-oriented data processing in which resources updated by operations performed within a transaction by a first process are not made accessible to other processes until resolution of the transaction (i.e., until determination of whether or not the transaction will complete successfully), and resource updates performed within the transaction are backed out atomically in response to a failure prior to resolution of the transaction, the method comprising the steps of:

performing forward processing of the transaction;

for each operation performed within the transaction which updates a recoverable resource, adding an entry to a volatile-memory list of all of said operations performed within the transaction, which list is maintained in volatile memory until resolution of the transaction, said list entry comprising an identifier of said first operation and an identifier of the resource operated on; and in response to a transaction failure before resolution of the transaction, reading the volatile-memory list for the transaction to determine which operations are to be backed out, and backing out the operations using the information of the volatile-memory list.

The volatile-memory list provides all the information necessary for backout of the transaction when a transaction-failure occurs, so that there is no need for reading of log records in order to carry out such backouts. It is preferred that the recovery facilities provided include log records in addition to the volatile-memory list. The present invention then optimizes the use of the log records by making them write-to-only records during normal processing; the logs would be read only for restart processing following a system failure. The volatile-memory list does not need to be a complete copy of the log records, but only needs to retain that information which would otherwise necessarily be accessed from the log in the performance of normal forward and backout processing, i.e., to perform rollback operations in response to transaction failures and preferably also to perform commit operations (or confirmation of commit as discussed below).

Thus, the volatile memory list is preferably a partial duplication of the log records in systems in which both facilities are provided, but there is a distinct difference between the two: the volatile-memory list does not include data but only instructions on how to find data (identification of the log records and possibly additional information such as information on how to UNDO the operations); whereas the log records have the complete information required for a complete rebuild of the resources being updated. It is preferred that an entry is added to the volatile-memory list for each operation performed within a transaction, including those which do not update recoverable resources (and therefore do not need log records to be written). The provision of a single list in which all of the operations within the transaction are referenced simplifies other aspects of the processing.

Preferably, commitment of a transaction is made an assumption of normal processing and so the committing of updates at successful completion of a transaction comprises confirming the assumed commitment.

The one or more log records written for an operation may additionally include information for UNDO of the operation, but certain types of UNDO can be implied from the operation itself and so do not need specific log records to be written. One log record may represent the combined effects of a plurality of operations, and thus provide information for REDO, and optionally also UNDO, of the plurality.

The volatile-memory list of operations of the present invention is distinguished from the prior art method of initially writing log records to virtual storage and then subsequently writing the logs to disk, in that the prior art method involves writing the logs to disk either periodically or when the information in virtual storage reaches a predetermined size, with no dependence on the state of the transaction. The cache memory list of the present invention is, for each of the as-yet-uncommitted transactions, a record of the whole of the transaction which has been performed so far. Writing of log records to disk according to the known systems is operating system dependent in terms of its frequency, whereas the present invention is a separate list of the entire set of updates for a transaction.

During backout, logging of the backout of individual operations can be performed as normal with the property that the log records written during the backout look exactly as if they had been written by traditional backout processing where the log is read to provide information on the operations that are to be backed out. A benefit of this which is additional to the generally improved efficiency of recovery is that it is possible to continue a commit or backout operation if the thread of control performing it originally were to be halted by the user. Commit or backout processing may be interrupted, for example by the instance of execution being halted, and can be subsequently resumed by another instance of execution since the volatile memory list is available to all applications. In known systems which can provide for continuation of recovery when the thread of control has been lost, there is a start-up following failure in which the normal commit or rollback is not in fact carried out; a "pretend" commit or rollback is implemented. The ability to continue normal execution when the thread of control is halted provides more robust recovery, providing greater availability than the known methods.

Operations on non-persistent resources are not logged since there is no need to harden operations on resources that are all deleted during restart after a failure.

Often, several concurrently running transactions can update different records that are under the control of a single data resource manager. The data resource manager must support an efficient means of sharing of the resources, and at the same time prevent any two transactions from accessing the same record simultaneously. The most commonly used method of achieving such concurrency control is locking, in which a given resource (e.g., a message or a record in a file) is reserved to one transaction instance at a time. A COMMIT-duration lock (i.e., a lock which remains until the transaction is committed) is acquired on a resource before it is updated. No other transaction may access this locked resource until the unit of work completes. All COMMIT-duration locks are generally released as the final step of a COMMIT or BACKOUT operation, at the end of the unit of work.

There is a problem with the known method of locking of objects until the resolution of a transaction, in that obtaining locks can entail a large overhead. This is especially important if a fine lock granularity is used (for example, if the object being locked is an individual record rather than a file including the record or a database of which the file is a part). Some operating systems do not provide good support for locking so that obtaining locks is slow and/or the maintenance of locks requires considerable application control. Also some operating systems only provide for mutual-exclusion (mutex) locking, so that only a single process may access the locked resource at any one time.

Provision for concurrent transaction processing is desirable for improved system response and utilization, and concurrency is clearly reduced where only mutex locking is supported as compared with systems which also support share-locking (where an individual process obtains a lock which prevents others from obtaining exclusive locks rather than obtaining exclusive locks itself). However, there is a trade-off between providing concurrency of resource access and the overhead of concurrency control procedures (the cost of maintaining locks). Mutex locks are fast to obtain compared with share locks and are widely supported across different operating systems.

It is a second aspect of the present invention to provide a method of fault-tolerant transaction-oriented data processing in which resource updates performed by processes within a transaction are backed out atomically following occurrence of a failure before resolution of the transaction, or are committed on successful completion of the transaction, the method comprising the steps of:

for each resource updating operation to be performed within the transaction, obtaining a mutually exclusive semaphore lock for the resource which is to be updated;

performing an update operation within the transaction in response to an operation request;

setting an indicator of the fact that the operation has been performed within a transaction, which indicator makes the operation request inaccessible to said processes;

releasing the mutually exclusive semaphore lock;

on successful completion of the transaction, committing all operations within the transaction for which the indicator has been set; and responsive to the occurrence of a failure before resolution of the transaction, backing out all operations within the transaction for which the indicator has been set.

The mutually exclusive semaphore locks are acquired on a resource, by one process at a time, to prevent processes which could otherwise concurrently access the resource from interfering with each other. This is important to preserve data integrity where resource updates are not made permanent until resolution of a transaction. Mutex locks are widely supported across different platforms, so the function provided by the present invention is portable between different platforms (e.g., REFERENCE, OS/2, OS/400).

The operations updating resources within a transaction preferably have an indicator set to show that they were performed as part of the transaction: this indicator may take the form of a flag on an operation request (such as flagging a message on a queue). The indicator appears as a lock which is held on the operation. Thus the operation for which an indicator has been set is logically locked until resolution of the transaction, this logical lock achieving the same purpose as physical locking (i.e., preventing other processes from performing the particular operation) without the overhead of a classical lock manager. In such an implementation of the present invention, committing certain resource updates may simply entail releasing the flags.

Since it is clear from the flags which operations have been logically locked, the present invention avoids the situation, found in the prior art methods, of applications trying to obtain locks on objects that are already locked and only then finding out that the object is unavailable. Backout, and preferably commit, processing involves scanning the volatile-memory list and processing each of the entries accordingly. This represents a considerable efficiency improvement for those operating systems in which reading of log records is not well supported.

Preferably, the method according to the second aspect of the present invention includes writing at least one log record for each operation within the transaction which updates a recoverable resource, said at least one log record including sufficient information for REDO of the operation. There may also be separate log records for UNDO of the operation, or there may be a single operational log record which can be used for both REDO and UNDO of a particular operation. Each log record may represent the combined results of a plurality of operations.

One implementation of the invention which will now be described is a message queuing system and method in which the ability to BACKOUT resource updates if a transaction is unable to complete successfully is provided. Message queuing allows programs to send and receive application-specific data, without having a direct connection between them. Messages, which are strings of bits and bytes that have meaning to one or more application programs, are placed on queues in storage so that the target applications can take them from the message queues and process them when they choose (rather than when the sending application chooses). The programs can then run independently of each other, at different speeds and times. Since the sending program is not constrained to check prior to sending a message whether the transaction can successfully complete, and the target application is similarly able to take a message from its incoming queue without prior checking, a backward recovery facility is often required. The sending application can generally proceed to further processing tasks after the message has been sent without awaiting the results of processing of the message.

Messages may be defined as persistent, meaning that they must be recovered following occurrence of a failure, or non-persistent, meaning that they need not be recovered.

The updates to a message queue within a transaction are a sequence of GET and PUT operations (i.e., operations to obtain a message from a queue and to place a message onto a queue, respectively) which occur atomically when the transaction commits (on successful completion) or are undone atomically when the transaction rolls back. Each of these GETs and PUTs for persistent messages have log records written for them. According to this implementation of the present invention, a record of each message operation performed within the transaction is also added to a list in volatile storage. The operation is performed as if committed (i.e., successful completion of the transaction and therefore COMMIT of all operations therein is assumed, since this is the usual operation at transaction resolution), but the resulting resource updates are marked so as to be inaccessible to other resource accessing applications until resolution of the transaction.

The recoverable data structure in such a system is a queue. To enable the queue to be returned to a stable state, copies of the queue are regularly made. Log records are written for all changes made to persistent messages on the queue between copies of the queue being made.

With reference now to the figures, FIG. 1 is a representation of the flow of messages during normal processing between two communicating programs in such a transactional message queuing system in the simple example of one-to-one communication. The two programs 10 and 20 send messages to each other via queues 30 and 40. A message queue is a named object in which messages accumulate and from which they are later removed. A message queue is not merely a stack—when messages are added they are added at the end, and they are usually removed from the front (although facilities exist for reading messages in a different order from that in which they appear on the queue). Each queue is under the management control of a respective queue manager 50 and 60 (the system service that provides the message-queuing facilities used by applications), the details of which management are not made apparent to the application program. For message queuing services to be available, there must be at least one queue manager on a system. A queue manager can own many queues. Each different queue manager instance is known by its name, which must be unique within the network of interconnected queue managers so that one queue manager can unambiguously identify the target queue manager to which any given message should be sent.

Applications communicate by agreeing to use particular named message queues, sending messages to the specific queues that the specific target programs have agreed to read from. The location of these queues is not apparent to the applications which send the messages; each application interacts only with its local queue manager. It is the network of interconnected queue managers that is responsible for moving the messages to the intended queues.

Referring again to FIG. 1, the first program 10 puts messages onto the second program's queue 30 without a dedicated logical connection having to be established between the programs. This message flow is represented in FIG. 1 by arrows f1, f2, f3 and f4. The queue managers 50 and 60 ensure that the messages are moved across the network, such that the programs themselves are shielded from network variations and complexities. This is represented in FIG. 1 by network link 70. Program 20 takes the messages from the queue 30 to process them when it is ready rather than when the sending program 10 chooses. Any changes made to recoverable resources by the transfer of messages and subsequent processing are recorded in recovery logs 80 and 90 in non-volatile storage for use in the event of a subsequent failure. These logs, sometimes known as journals, are a facility provided by the underlying operating system and are described further in the IBM publication "AS/400 Programming: Backup and Recovery Guide" (SC21-8079).

All of the work involved in maintaining message queues, in maintaining the relationships between messages and queues, in handling network failures and restarts, and in moving messages around the network is handled by the queue managers. Since cross-network communication sessions are established between queue managers rather than between individual programs, programs are less vulnerable to network failures than in certain other types of interprogram communication. If a link between processors fails, it is the job of the queue managers to recover from the failure. Programs on the affected processors are not brought to a halt by such an event. In fact they need not be aware that it has happened.

In messaging and queuing, there are no constraints to application structure. Two-way reciprocal communication is possible, as well as one-way message flow, as shown in FIG. 1. Separate queue 30 and 40 exist for receipt of messages for each of the programs 10 and 20. Additionally, the communication can be one-to-many (such as where three copies of a single program are running concurrently for load-balancing purposes, and may be taking messages from the same queue), or many-to-one (such as if there are multiple clients sending messages to a single server), or a combination of all of these relationships.

In normal (i.e., not restart) processing, transactions may be in forward progress, partial rollback or total rollback (abort). The rollbacks may be system or application initiated. The causes of rollbacks may be error conditions, integrity constraint violations, unexpected database state or other reasons. The following data structures are provided in the system of FIG. 1 to assist recovery.

Logging

Changes to resources are stored using logs 80 and 90. The log records have the following information in them, with some types of log record adding other information as well:

| | |
|---|---|
| Owner | The name of the system subcomponent that owns the log record; |
| Type | The type of the log record (e.g., compensation, regular update, or a commit protocol related record); |
| TranID | The identification of the associated transaction (if any, see below) which wrote the log record; |
| PrevLSN | Log sequence number (LSN) of the previous log record in this transaction (this field has a value of zero in the first log record of each transaction); a log sequence number is a unique identifier for a record on a log. |
| Data | Area containing type-dependent information such as the before and after images of a change. This would typically include a message queue identifier. |

As one example of record-type-specific data, Compensation Log Records (CLRs) also have another LSN, called the "UndoNextLSN", which is the LSN of the next log record needing undoing during transaction rollback.

Some log records are written to describe updates to the object catalogue which is a list of all objects defined to the system, including message queues. Some others are written to describe operations on persistent messages outside of syncpoint control. These updates do not occur inside transactions. All such updates are logged by value and not by the logical operation that they represent. The log records are of the following types:

| | |
|---|---|
| MSGPUT | One of these log records is written when a persistent message is put on a queue. They are UNDO/REDO records meaning that they contain enough information to re-apply or remove the change. To undo a message put operation, it will be necessary to have knowledge of the current state of the queue file which contains the messages in a queue and a header file including pointers to the messages. This information is held in the message list. The message list is a set of doubly-linked lists, one per queue, which contains a record for each message on the queue. |
| PUT PART | These log records are written whenever a persistent message is written to a queue but is written split up into disjoint parts by the space allocation routines for the queue. They are also used whenever a MSGPUT log record reaches the log record size limit and has to be split. The main part of the message will be described by a MSGPUT record, but there may be multiple PUTPART records written to describe the rest of the message. They are REDO ONLY records. |
| MSGGET | One of these log records is written when a persistent message is got from a queue. They are UNDO/REDO records. To undo a message get operation, it will be necessary to have knowledge of the current state of the queue file since the message which pointed to the message when it was got may have changed. |
| QCREATE | Written during creation of a queue to record the initial state of the queue file. |
| QATTRS | One of these log records is written whenever the attributes of a queue are updated. They are REDO ONLY records. |
| QDEPTH | One of these records is written during a successful shutdown for each loaded local queue to update the current depth of the queue recorded on disk. They are REDO ONLY records. |
| PURGE | One of these records is written whenever a queue is purged. They are REDO ONLY records. Compensation Log Records (CLR) One of these log records is written to undo each change undone during rollback. A CLR is also written to negate any logged operation which failed. They are REDO ONLY records. This means that they contain only enough information to re-apply the change since they are never undone. Because of the presence of the UndoNextLSN in each |

-continued

Figure 2:
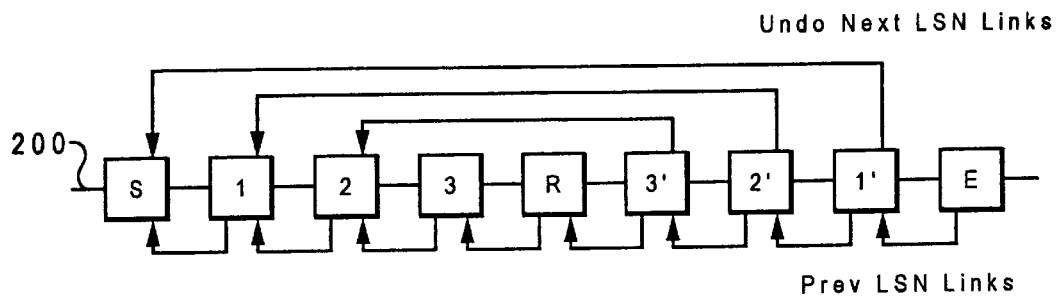
FIG. 2 shows schematically the links between log records according to an embodiment of the present invention.

| | |
|---|---|
| | CLR, the CLR prevents the undoing of the change that it represents from being repeated during restart. Restart instead skips to the next change that needs undoing. Figure 2 illustrates this. Note that these records represent the logical operations needed to undo the changes that they negate, not the exact physical reverse of the changes. In order to honour the Write-Ahead Logging protocol, it is necessary to write each CLR individually. |
| TRANTABLE | These log records are written during the first part of checkpoint processing to record the transaction table (see below). |
| STARTTRAN | One of these log records is written when a new transaction starts. While this is not strictly necessary, it makes the log easier to read. |
| PREPARE | One of these log records is written when a transaction is prepared to commit. This record is forced. |
| COMMIT | One of these log records is written when the decision is made to commit a transaction. |
| ROLLBACK | One of these log records is written when the decision is made to rollback a transaction. |
| ENDTRAN | One of these log records is written when a transaction is completed. When a transaction is committed, one of these records will follow all other records associated with the transaction. When a transaction is rolled back, a rollback record will be written followed by the CLRs for the removal of the transaction's changes and finally an end of transaction record is written. |
| BEGINCHKPT | A record of this type is written at the start of a system checkpoint. |
| ENDCHKPT | A record of this type is written at the end of a system checkpoint. |
| | The log records associated with a transaction are linked using the "PrevLSN" field in each log record, as represented in Figure 2. The sequential log 200 contains the log records of a transaction which performs queue updates 1, 2 and 3. Now, let us assume the transaction is rolled back. A log record, say R, is written, and compensation log records 3', 2' and 1' are written (where 1' is the CLR to undo 1, and so on). Then the end of transaction record, E, is written. There may be log records for other transactions in between the ones for this transaction. |

The links associated with this transaction take care of this possibility by providing each transaction with its own logical log within the real log. Because the log is not read during normal processing, and the data structure recovery routines are thus not sure whether a log record recording an operation has been written or not, the policy of risking writing the log record again during recovery is followed, rather than never writing log records during recovery and thus risking missing a log record completely.

Transaction Table

A linked list of transactions which are active for a particular queue manager is maintained by the queue manager. Each transaction in this list (referred to hereafter as the transaction table and represented by numeral 270 in FIG. 3) has a unique identifier. More particularly, the table has an entry 260 for each active transaction which comprises the following information:

the transaction's unique identifier;
the transaction's current state (active, prepared or rolling back);
the log sequence number (LSN) of its "STARTTRAN" log record (i.e., the log record which was written when the new transaction started).
the LSN of its latest log record;
a pointer to its softlog 250 (see below);
a mutex semaphore for ensuring only one process is associated with a transaction;
a mutex handle for ensuring that access to the Transaction Control Block (TCB) is serialized. (The TCB is a data structure which describes the transaction).

The transaction table is used to track the state of active transactions. The persistent parts of the transaction table must be rebuilt during system restart following a failure. To optimize this process, it will be logged at regular intervals as part of a system checkpoint. A checkpoint is the operation of forcing objects to disk, which is done to shorten the time taken to recover objects after a system failure by reducing the amount of the log which needs to be applied to make the objects up-to-date.

The logged version of the transaction table will contain all of the same entries as the in-memory version with the exception of the pointer to the softlog which is rebuilt during startup for all transactions which are in-doubt. The transaction table may be larger than the maximum size of a log record and will then be logged in multiple records.

Softlog

Softlogs 250 include lists maintained in volatile memory to assist recovery. They duplicate much of the information held in the log in non-volatile memory, although not including all of the same information as the log. The softlogs provide a record of the actions that need to be performed to effect a commit or rollback on the queues, avoiding the need for selective backward scanning of the log.

Figure 3:
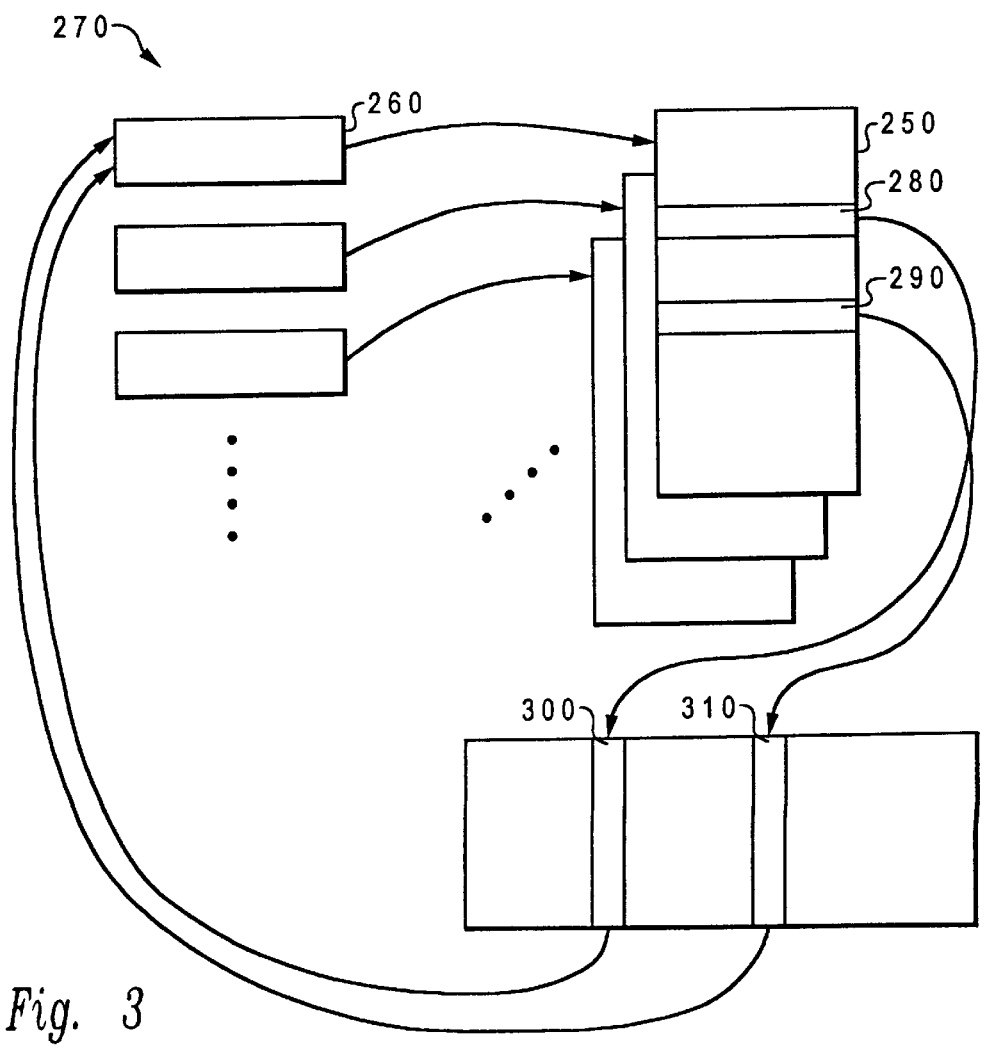
FIG. 3 shows the interrelationships between a transaction table, a set of volatile-memory lists of operations for the transactions, and records for the operations in the recovery log according to an embodiment of the present invention.

As shown schematically in FIG. 3, there is a softlog 250 for each in-flight transaction attached to the transaction's entry 260 in the transaction table 270. The soft log is a record of all get and put operations performed within the associated transaction, and exists to enable rapid commit and rollback processing. It includes entries for both persistent and non-persistent message operations, which pertain to transactions. In contrast, only persistent message operations are logged in non-volatile logs 80 and 90 and these may include any non-transactional persistent updates made by the system.

There will be an entry in a transaction's softlog for each message get and put operation 280 and 290 within the transaction (during normal processing only—during restart recovery when the softlogs for the active transactions are rebuilt as will be described below, only the entries for the persistent message operations are placed in the soft log). Each softlog entry contains enough information to build the CLR corresponding to the rollback of the queue operation that the softlog entry describes.

The softlog entries have the following format:
Identifier of the queue holding the affected message;
Index of the message on the queue;
Reason for the entry (GET, PUT or TRIGGERPUT);
The LSN of the log record 300 and 310 written for this operation within the transaction; or the LSN of the last logged operation for this transaction (used to build up the log record links); or both (each one of these two LSNs is inferrable from the other, but the softlog entries may have both);
Status flags.

As shown in FIG. 3, the transaction table entry 260 has a pointer to its softlog list 250 of operations and the softlog entries 280 and 290 have pointers to their log records 300 and 310. The log records in turn have pointers to the transaction table.

There is also a header structure, which includes fields for the number of entries in the softlog, the maximum number of softlog entries (the softlog is a fixed size memory block, whose number of elements is the maximum number of uncommitted messages allowed in a transaction), and an order field which is used to determine in which order the softlog is processed (needed because it is difficult to add elements to an array at the front).

The softlog normally contains entries in chronological order which are processed forwards during commit processing, and backwards during rollback processing. This situation is more complicated during restart recovery since the softlog is actually rebuilt from the log in reverse order. Thus, the commit and rollback processing during restart processes the softlog in the opposite order to that used during normal execution.

It would be possible to record the softlog in the log as part of a system checkpoint, but because this could be expensive it is instead built up during recovery from system failures—typically an infrequent occurrence—as detailed later.

A transaction containing no work will have an entry in the transaction table but the associated softlog will contain no entries. Thus, the commit and rollback processing of such empty transactions does not require that softlog entries are processed.

Locking

Simple mutex semaphores are used to control access to shared information, without the need for a lock manager and so with the benefit of portability to systems which do not have full-facility lock managers (although with the expense of some concurrency loss). The object of the semaphore "lock" is a queue, providing implicit locking of all of the messages on that queue. Each queue has a mutex semaphore which can only be held by one process at a time and each process can only hold one mutex at a time (except in certain special cases). To access any of the queue's data structures, this mutex must be obtained, the access performed and then the mutex released. This technique alone would not be sufficient in the case of messages put under syncpoint control since the queue should not be locked for the entire transaction. It is necessary to know whether a queue is associated with any active transactions so that the queue is not unloaded or deleted. To achieve this, there is a counter associated with each queue, which is the number of uncommitted messages on the queue.

Messages which are not available either because they have been put or got by an uncommitted transaction are marked as invisible in their message list so that a scan of the queue will ignore them, by setting an indicator that the message has been got or put within a transaction. This obviates the need for a lock manager holding exclusive locks on individual messages.

Figure 4:
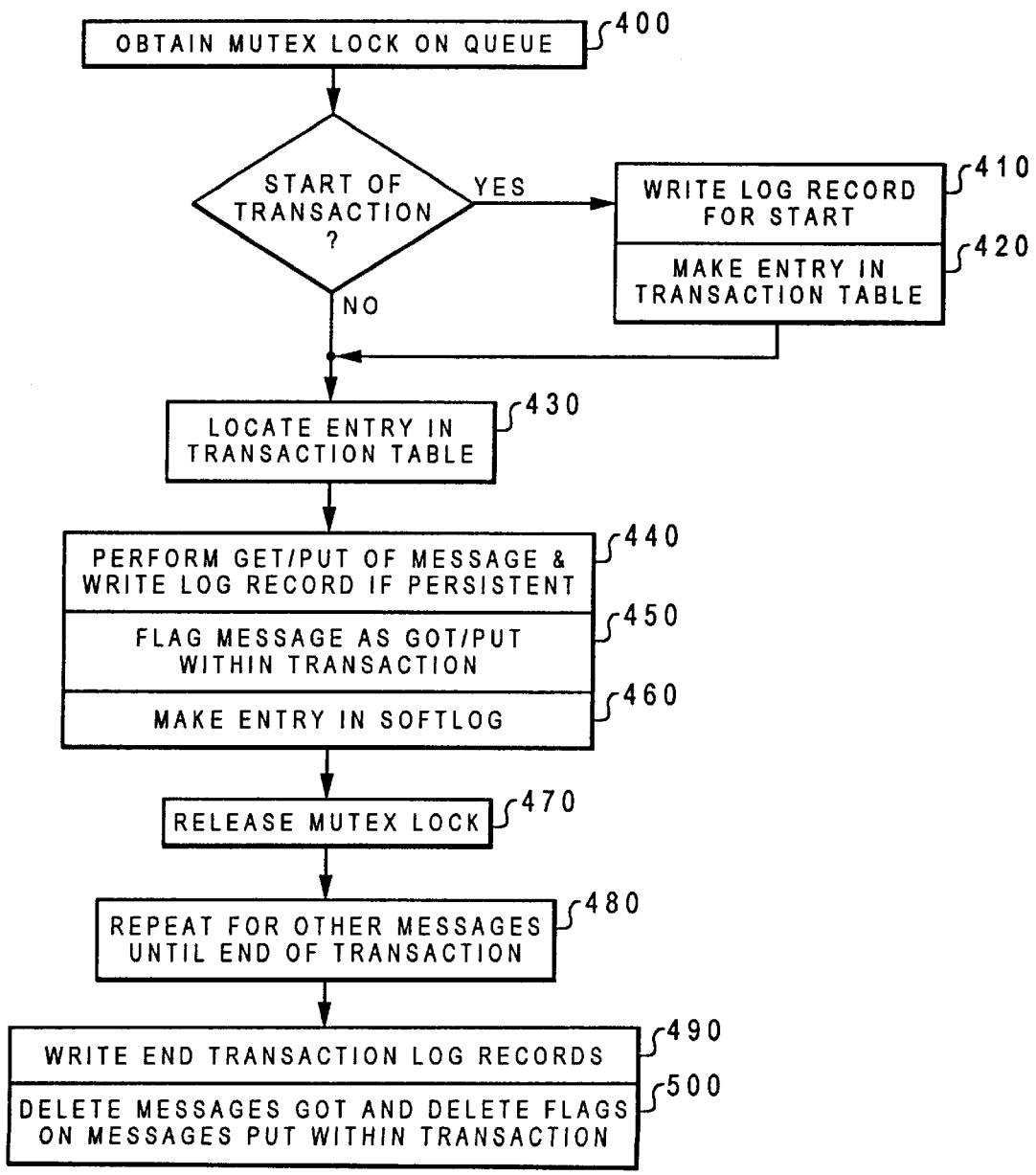
FIG. 4 shows the sequence of operations carried out during forward processing of a transaction which completes successfully according to an embodiment of the present invention.

FIG. 4 shows the general steps in the forward processing of messages within a transaction through to successful completion. Firstly, an application serving a queue obtains (400) a mutex lock on the message queue, preventing any other applications from accessing the queue. This clearly does not provide for as high a degree of concurrency as locking individual messages, but the lock control procedures are simpler than for high granularity locking. If this is the start of a transaction, then log records are written (410) for the start and, atomically, an entry is made (420) for the transaction in the transaction table. Otherwise, the current transaction entry is located (430).

The message is then operated on (440): a GET operation obtains the message from the queue (for the message to then be processed by the obtaining application or PUT to another queue if the receiving application is not the target application), or a PUT operation puts the message onto the queue. All message operations under syncpoint control are a sequence of PUTs and GETs. In more detail, the step 440 for a PUT operation includes the following substeps:
a) locate where to place message and identify predecessor;
b) if persistent, log all details;
c) write the message to the selected space;
d) write linkage to the queue; and
e) add into memory list for the queue.
For a GET operation, the substeps would be:
a) locate message in memory list;
b) read details of message;
c) if persistent;
   identify predecessor and successor;
   log details;
   write unlinkage to queue;
End if
d) remove from memory list.

Atomically with this performance of the operation, the message is flagged (450) in the first queue as having been operated on within the transaction and an entry is made (460) for the operation in the softlog. The message is now unavailable to other applications serving the queue.

The application can now release (470) its mutex lock as it is no longer necessary to prevent other applications from servicing the queue. The message operated on remains flagged as having been removed from the queue and so it is not available to applications—the flag acting as an exclusive lock on the message. The above steps are then repeated (480) for other messages within the transaction until the transaction is completed. On successful completion of the transaction, log records are written (490) to mark the end of the transaction and, atomically, all flagged messages got within the transaction are deleted (500) from the incoming queue and all flags on messages put within the transaction are deleted.

If any of the operations performed within the transaction raise error conditions or if any other data integrity constraints are violated, then the transaction cannot be allowed to complete and must be rolled back. The rollback procedure comprises deleting the flags on messages got within the transaction so that they are again made available on the queue and deleting messages PUT within the transaction, and writing compensation log records for the log records written during forward processing.

A transaction goes through several stages before resolution. Different processing is carried out during each phase of the transaction. The transaction manager is responsible for indicating that a transaction has passed from one phase to another.

The following steps are performed for each phase of a transaction:

Prepare to Commit

At prepare time, a "PREPARE" log record must be written. During this phase, the queue manager is expected to ensure that it can commit when requested. If all changes inside the transaction have already been hardened to the log, it is only necessary to record the fact that it had been asked to prepare. Thus, the queue manager will always vote "yes" to a prepare request unless it cannot write this log record, in which case it will vote "no".

Commit

When a transaction is committed, a "COMMIT" log record is written. This is desirable for portability between different systems since not all transaction managers can deal with the situation of logging of commitment being overlooked.

The soft log associated with the transaction is examined for details of which messages were put and got as a result of the transaction. The soft log is scanned and each record is processed as follows, locking and unlocking the queue as necessary:

| | |
|---|---|
| MSGPUT | The associated message is made visible and the number of uncommitted messages is decremented. The Local Queue Manager component of the message queue manager is informed that messages have appeared on the queue which could potentially satisfy waiting get requests. |
| MSGGET | The space taken by the message is released and the message removed from the queue. The uncommitted message count is decremented.<br>Finally, an "ENDTRAN" log record is written. |

Rollback

When a transaction is rolled back, a "ROLLBACK" log record must be written.

The soft log associated with the transaction is examined for details of which messages were put and got as a result of the transaction. The soft log is scanned and each record is processed as follows locking and unlocking the queue as necessary:

| | |
|---|---|
| MSGPUT | The message must be removed from the queue by altering the link from the previous message to point to the next message (if any). A compensation log record must be written prior to this change if the message was persistent to describe this update. The space taken up by the message is released and the number of uncommitted messages is decremented. |
| MSGGET | The message must be re-instated on the queue by altering the pointer in the previous message (if any) to point to this message. A compensation log record must be written to describe this update if the message was persistent. The message is made visible and the uncommitted message count is decremented. The message's backout count will also be incremented. Since the space taken up by an uncommitted get message is not freed until the associated transaction is committed, the space does not need reclaiming for the message during rollback.<br>Finally, an "ENDTRAN" log record is written. |

The MSGPUT and MSGGET log records do not contain before images of the areas that they are changing. This means that the converse of these operations must be inferred rather than simply read from the log. This is done using knowledge of the contents of the queues.

Restart

In the event of a system failure or other failures extending beyond a single transaction, processing must be restarted using the log records from non-volatile storage.

Restart processing involves three passes of the log: the redo pass, the in-doubt pass and the undo pass. Each of the queues and other objects is accessed as required; queues not participating in recovery are not loaded. Before recovery proper can proceed, it is necessary to read in the object catalogue. This is assumed to be undamaged, any damage requiring that a backup copy of the catalogue is provided for data recovery, which must itself be undamaged.

The Redo Pass

The redo pass is concerned with establishing the state of play before the queue manager starts working. Before this pass has completed, it is not necessarily true that the queue files make sense since there may be incomplete updates in them. It begins by reading the previous system checkpoint record (if one exists). The location of this is held in the restart record. The checkpoint contains a transaction table which will be used during the first scan of the log. The object catalogue will have been loaded before this processing starts, since knowledge of the valid objects will be needed.

The log is scanned forwards and the following actions are performed for each log record from the current checkpoint to the end of the log.

1. If the log record changes the state of a known transaction in a valid way, the transaction's state is changed as requested, removing the transaction from the transaction table if it has completed.

This includes updating the LSN of the transaction's last log record in the transaction table.

2. Otherwise, the change detailed by the log record is applied. All records applying to non-existent objects (which may have been deleted) are ignored.

This processing includes updating the LSNs of the transactions' last log records in the transaction table when needed.

At the end of this pass, all of the changes since the last checkpoint will have been re-applied to the queues and the transaction table will be consistent with its state when the queue manager was stopped.

A checkpoint is now taken to reduce the amount of replay during subsequent restarts.

The In-Doubt Pass

For any active transactions, it will be necessary to re-build the soft logs 250 associated with them to allow commit or roll back processing. This is done by a backward scan of the log following the PrevLSN chains of log records for each in-doubt transaction.

1. For each transaction in the transaction table, scan backwards along the chain of log records for the transaction by following the PrevLSN chain. If any CLRs are found in a transaction,instead follow the Next UndoLSN link for this record (to skip log records that have already been undone).

2. For each "MSGPUT" or "MSGGET" log record found, establish which message on which queue was involved, find the message from disk if necessary and add an entry to the soft log for the transaction describing the change. The message must be marked as hidden in its message list and the number of uncommitted messages incremented.

This pass of the log could continue backwards beyond the start of the last checkpoint record since it has to read back to the start of the oldest active transaction.

At the end of this pass, each transaction will have its soft log intact and ready for processing of commit or rollback requests. All messages got or put by committed or rolled back transactions are in the required state. It just remains to roll back the unprepared transactions.

The Undo Pass

This pass is concerned with rolling back all unprepared transaction (remembering that the transactions which were partially rolled back when the system stopped have been marked as unprepared). Since the soft logs for each of these transactions have been rebuilt in the in-doubt pass, we can simply invoke normal rollback processing for each of these transactions.

An alternative design, which results in a single pass of the log reading many more log records is to undo the necessary updates in strict reverse chronological order which may involve undoing updates from different transactions with each pass through the loop. The disadvantage of this is that we must examine the transaction table with each pass of the loop to see which transaction has the maximum UndoNextLSN and undo this update first. This is not necessary since all undo operations are carried out as logical updates and can be applied in any order.

At the end of the undo pass, the queue files are consistent with the memory structures representing the queues and all transactions which need to be rolled back have been rolled back. Now the queue manager can begin to accept work.

The final step is to take a system checkpoint and unload all queues which were loaded during restart.

While the invention has been particularly shown and described with reference to a preferred embodiment, it will be understood by those skilled in the art that various changes in form and detail may be made therein without departing from the spirit and scope of the invention.

What is claimed is:

1. A method of fault-tolerant transaction-oriented data processing in which resource updates performed by processes within a transaction are backed out atomically following occurrence of a failure before resolution of said transaction, or are committed on successful completion of said transaction, said method comprising the steps of:

for each resource updating operation to be performed within said transaction, obtaining a mutually exclusive semaphore lock for a resource which is to be updated;

performing a resource updating operation within said transaction in response to an operation request;

setting an indicator signifying that said resource updating operation has been performed within said transaction, said indicator making said operation request inaccessible to said processes;

in response to said indicator being set, releasing said mutually exclusive semaphore lock prior to completion of said transaction;

in response to successful completion of said transaction, committing all operations within said transaction for which said indicator has been set; and in response to an occurrence of a failure before resolution of said transaction, backing out all operations within said transaction for which said indicator has been set.

2. A transaction-oriented data processing system in which resource updates performed by processes within a transaction are backed out atomically following occurrence of a failure before resolution of said transaction, or are committed upon successful completion of said transaction, comprising:

means for performing a resource updating operation within said transaction in response to an resource updating operation request by one of said processes;

means for setting an indicator signifying that said resource updating operation has been performed within said transaction, said indicator making said resource updating operation request inaccessible to said processes;

a lock manager which grants to a process a mutually exclusive semaphore lock for a resource which is to be updated by an operation within said transaction, wherein said lock manager releases said mutually exclusive semaphore lock prior to completion of said transaction in response to said indicator signifying that said resource updating operation has been performed being set;

means for committing all operations within said transaction for which said indicator has been set in response to successful completion of said transaction; and means, responsive to an occurrence of a failure before resolution of said transaction, for backing out all operations within said transaction for which said indicator has been set.

* * * * *